United States Patent
Siddiqui et al.

(10) Patent No.: US 9,824,146 B1
(45) Date of Patent: Nov. 21, 2017

(54) USING MEDIA EVENTS TO PREDICT TIME SERIES DATA

(75) Inventors: Muhammad Ali Siddiqui, Snoqualmie, WA (US); Colin Bodell, Seattle, WA (US); Jeff M. Bilger, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 564 days.

(21) Appl. No.: 13/474,037

(22) Filed: May 17, 2012

(51) Int. Cl.
 *G06F 15/18* (2006.01)
 *G06F 17/30* (2006.01)
(52) U.S. Cl.
 CPC .............. *G06F 17/30864* (2013.01)
(58) Field of Classification Search
 CPC ......... G06F 17/30522; G06F 17/30643; G06F 17/2735; G06F 17/3053; Y10S 707/941; Y01S 707/948; G06N 5/022
 See application file for complete search history.

(56) References Cited

U.S. PATENT DOCUMENTS

| | | | | |
|---|---|---|---|---|
| 6,654,749 | B1* | 11/2003 | Nashed | 707/706 |
| 2009/0006388 | A1* | 1/2009 | Ives et al. | 707/5 |
| 2009/0307196 | A1* | 12/2009 | Shuster | 707/3 |
| 2010/0332583 | A1* | 12/2010 | Szabo | 709/202 |
| 2011/0087647 | A1* | 4/2011 | Signorini et al. | 707/709 |

\* cited by examiner

*Primary Examiner* — Stanley K Hill
*Assistant Examiner* — Peter Coughlan
(74) *Attorney, Agent, or Firm* — Thomas Horstemeyer, LLP

(57) ABSTRACT

Disclosed are various embodiments for using media reported events to generate predictions for time series data. Information retrieved from a plurality of network content sources is classified into a plurality of categories. A prediction is generated for a time series. The time series is associated with a metric observed in a computing system. The generated prediction takes into account an impact of at least one of instance of the classified information.

23 Claims, 3 Drawing Sheets

USING MEDIA EVENTS TO PREDICT TIME SERIES DATA

BACKGROUND

Many computing system generate metrics during system operation. Such metrics may describe various aspects of the system such as system performance and errors encountered by the system. Such metrics may be collected and analyzed to better understand the behavior of the system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to generating predictions from time series data, and more specifically to using media events when generating predictions from time series data. Metrics gathered during the operation of a computing system can be used to predict future behavior of the system. For example, a history of past customer orders in an electronic commerce marketplace can be used to predict the future demand for products. Predictions which use mathematical models such as linear regression are reasonably accurate in taking into account regular or periodic events, such as seasonal variations in purchasing behavior and daily variations in user viewing or browsing behavior. However, purely mathematical models do not adequately handle unusual events that are unrelated to the system being measured.

Various embodiments disclosed herein enhance the predictions made from time series data by taking into account the business impact of real world events on various metrics. The embodiments disclosed herein gather information about real world events from external sources such as social network sites, news publisher sites, and news aggregator sites. The information about real world events may be gathered in an active manner, in which the system accesses various network content sources such as network sites or web sites and actively retrieves the information from these sources. The information about real world events may be gathered in a passive manner, where the sources proactively provide the information to the system on a periodic basis. For example, a source may use a publish/subscribe model, where the content source publishes new content and this content is made available to subscribers. A Really Simple Syndication (RSS) feed is one example of a publish/subscribe model.

Once information is obtained from a network content source, the information is then classified into various categories. The embodiments disclosed herein use these media events and categories to measure the effect of events and categories of events on various metrics. The measured impact of events on metrics can then be used when generating a forecast for a particular metric and time period.

The particular examples discussed herein relate to metrics for an electronic commerce system. However, the techniques disclosed herein also apply to time series that represent other types of data. In the following discussion, a general description of the system and its components is provided, followed by a discussion of the operation of the same.

Figure 1:
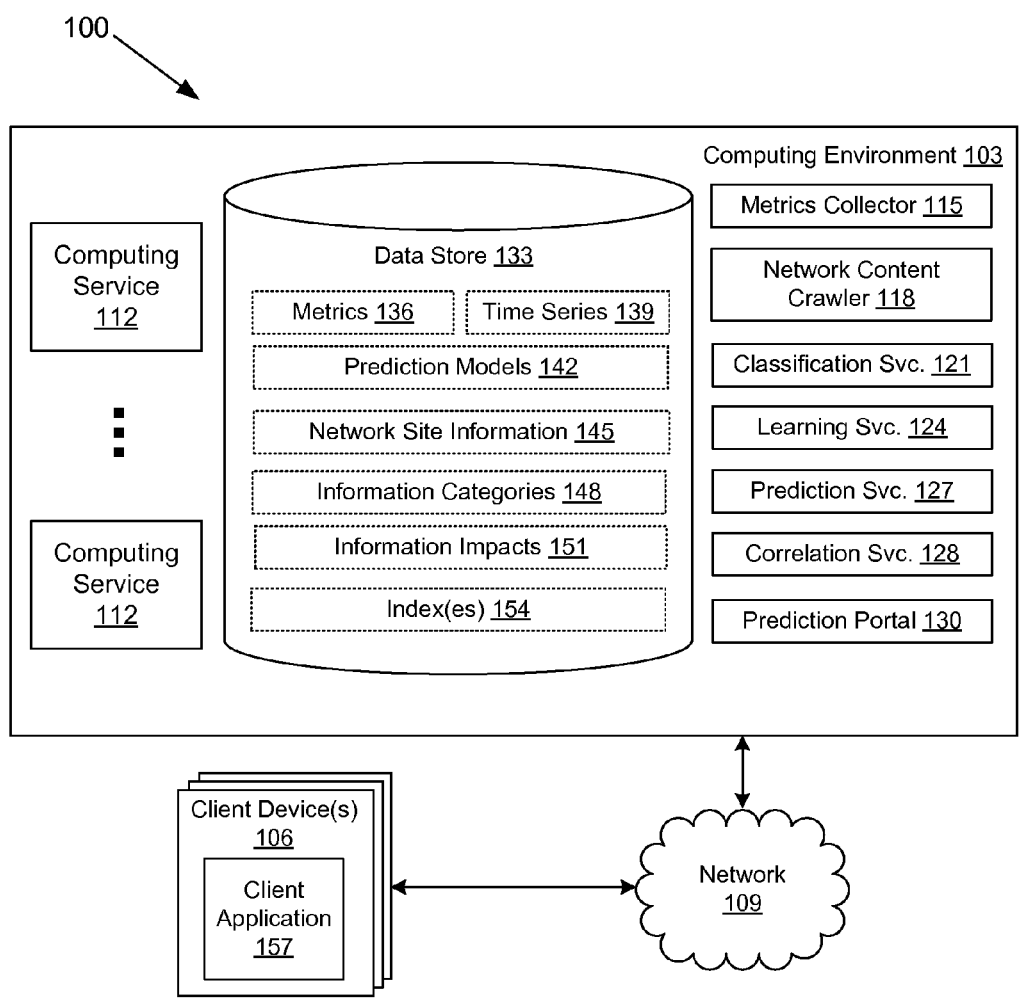
FIG. 1 is a drawing of a networked environment according to one embodiment of the present disclosure.

With reference to FIG. 1, shown is a networked environment 100 according to various embodiments. The networked environment 100 includes a computing environment 103 and one or more client devices 106, in data communication by way of a network 109. The network 109 includes, for example, the Internet, intranets, extranets, wide area networks (WANs), local area networks (LANs), wired networks, wireless networks, or other suitable networks, or any combination of two or more such networks.

The computing environment 103 may comprise, for example, a server computer or any other system providing computing capacity. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

The computing environment 103 may be operated by a hosting provider to host network sites for various entities, or may be controlled and managed by a provider entity that provides access to resources of the computing environment 103 to entities for a fee under a utility computing model. For example, entities may arrange for access to applications executing in the computing environment 103, for storage in the computing environment 103, or for messaging between components in the computing environment 103. Such a system is sometimes referred to as "cloud computing system," but the term "cloud computing" is not intended to be limiting.

The computing environment 103 may utilize differing hardware platforms and may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. The computing environment 103 may be executing instances of virtual machines used to provide general computing capability to entities. Such entities may be capable of terminating machine instances or launching machine instances whenever they desire, thereby providing an elastic computing resource.

Various applications and/or other functionality may be executed in the computing environment 103 according to various embodiments. The components executed in the computing environment 103 include, for example, computing services 112, a metrics collector 115, a network content crawler 118, a classification service 121, a learning service 124, a prediction service 127, a correlation service 128, a prediction portal 130, and other applications, services, processes, systems, engines, or functionality not discussed in detail herein. Various data is stored in a data store 133 that is accessible to the computing environment 103. The data store 133 may be representative of a plurality of data stores as can be appreciated. The data stored in the data store 133, for example, is associated with the operation of the various applications and/or functional entities of the computing environment 103 as described herein. The data stored in the data store 133 includes, for example, metrics 136, time series 139, prediction models 142, network site information 145, information categories 148, information impacts 151, media site indices 154, and potentially other data.

A computing service 112 is executed to provide a particular functionality to the computing environment 103 as a whole, and in doing so, may export one or more functions through a programmatic interface. A computing service 112 may be implemented, for example, as a web service. Various computing services 112 may (singly or in combination) implement features such as a network storage service, a cloud computing service, a search service, an advertising service, a network page server, an electronic commerce marketplace, or components thereof.

In providing their respective functions, the various computing services 112 may generate one or more metrics 136. For example, a network page server may track metrics 136 such as latency in generating network pages, the number of pages generated in a time period, the number of customers requesting a particular network page, etc. As another example, a network storage service may track metrics 136 such as the latency in fulfilling a storage request, the number of customers creating a storage object, etc. As yet another example, a search service may track metrics 136 such as the latency in fulfilling a search query, the number of search queries fulfilled in a particular time period, etc.

The metrics collector 115 is executed to collect the various metrics 136 produced by the computing services 112 and to store the metrics 136 in the data store 133. The metrics collector 115 may also aggregate the collected metrics 136 in various ways. For example, the metrics collector 115 may aggregate all instances of a metric 136 from a particular computing service 112 (e.g., the search service) that reside in a particular data center, that reside in a particular geographic region, etc.

Each particular metric 136 has a particular value at a particular time, and the metrics collector 115 is further configured to collect these values into a time series 139 for the metric 136. For example, latency metrics 136 produced by the network page server may be gathered into a network page latency time series 139, which can be viewed as a series of {time, value} pairs. Each time series 139 has a particular resolution or periodicity, e.g., hourly, daily, weekly, monthly, quarterly, etc.

The network content crawler 118 is executed to visit one or more sources of network content and to parse the data obtained from the network sites. The data is parsed to identify various types of network site information 145 such as news, events, announcements, reports, and so on. The network content crawler 118 is further executed to index references to the network content 145 identified from the network sites, thus producing a site index 154 that is stored in the data store 133. The network content crawler 118 may "crawl" from one network site to another, using hyperlinks, as may be appreciated. The visited network sites may include, for example, news aggregator sites, news publisher sites (e.g., CNN.com, WSJ.com, etc.), and social networking sites (e.g., Facebook®; Twitter®; Google+®; StumbleUpon®, etc.).

The classification service 121 is executed to classify the network site information 145 into one or more information categories 148 using techniques further described herein. These categories 148 may be dynamically learned by processing the network site information 145. The information categories 148 may correspond to topic areas such as Sports, Disasters, Politics, Economics, and so on. The information categories 148 may also correspond to geographic regions, such as World, Region, Nation, State, and so on.

The learning service 124 is executed to determine the impact of reported information 145 on metric 136 using techniques described herein. For example, the learning service 124 may learn, through processing a time series 139 during which particular instances of reported information 145 occurred, that orders placed with an electronic commerce merchant were affected by a sporting event. As one specific example, the learning service 124 may determine that customers in Germany placed fewer orders during a World Cup soccer match. As another example, the learning service 124 may determine that customers in Japan placed more orders for water and bottles immediately after an earthquake.

The prediction service 127 is executed to provide predictions for time series 139, each of which is associated with a metric 136. The prediction service 127 uses the services of the learning service 124 and the classification service 121 to provide predictions which take into account the impact of reported information 145 on the metric 136.

The correlation service 128 is executed to determine the accuracy of a prediction provided by the prediction service 127 by looking for a correlation between an instance of reported information 145 and a time series 139. The learning service 124 then uses information provided by the correlation service 128 regarding one prediction to improve subsequent predictions.

The prediction portal 130 is executed to provide predictions for time series 139 to client devices 106. In some embodiments, the prediction portal 130 is integrated with the prediction service 127. In some embodiments, the prediction portal 130 is integrated into a comprehensive analytics tool that also provides other types of analytics data to developers of the computing environment 103.

Having discussed the computing environment 103, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability. The client device 106 may be configured to execute various applications such as a client application 157. The client device 106 may be configured to execute applications beyond the client application 157 such as, for example, email applications, messaging applications, and/or other applications.

The client application 157 may be executed in the client device 106, for example, to interact with the prediction portal 130. Through the prediction portal 130, a user may request time series predictions from the prediction service 127. The prediction service 127 generates a prediction as described herein and returns this information to the client application 157. The client application 157 may then provide information about the prediction to the user, which may involve rendering a graphical display of the prediction. The client application 157 may be execute in the context of a browser (not shown), or may be implemented as a stand-alone application.

A general description of the operation of the various components of FIG. 1 is provided. To begin, the various computing services 112 execute and, in doing so, generate metrics 136. These metrics 136 are periodically collected by the metrics collector 115 and stored in the data store 133. The metrics 136 are processed to generate a time series 139 for each metric 136. These time series 139 are also stored in the data store 133.

In the background, the network content crawler 118 visits one or more sources of network content and parses the content of those sites to extract reported information 145 such as news, events, announcements, and so on. The network content crawler 118 generates one or more indices 154 so that this content can be searched and efficiently retrieved. The indices 154 are stored in the data store 133. The classification service 121 periodically retrieves reported information 145 and classifies the information 145 into information categories 148.

Once the reported information 145 has been categorized and time series 139 have been collected, the learning service 124 then processes this data to learn the business impact that a particular instance of reported information 145 has on the time series 139 and thus on the metric 136 associated with the time series 139. The learning service 124 may process new time series 139 as series are added to the data store 133, or the learning service 124 may process several groups of time series 139 at a time until all time series 139 have been processed. Similarly, the learning service 124 may measure the impact of a particular media event 145 when that media event 145 is classified by the classification service 121.

At some point, a user interacts with the client application 157 to request a prediction for a particular metric 136, where the prediction takes into account the effect of one or more instances of reported information 145 on the metric 136. More specifically, the client application 157 requests a prediction through the prediction portal 130. The user identifies a metric 136 and a time period, which together specify a time series 139. In some embodiments, the user specifies a particular media event 145. This may be useful when the consumer of the prediction service 127 has reason to believe that the metric 136 is affected by a specific media event 145. In some embodiments, the user may also request an additional initial prediction that is independent of media event effects. In some embodiments, the user may also specify a particular type of prediction model.

The prediction portal 130 in turn passes the prediction request to the prediction service 127. In some embodiments, prediction service 127 is exposed as a web service, which may be publicly accessible. The prediction service 127 uses the services of the learning service 124 to generate the prediction. As noted above, the learning service 124 determines the effect of instances of reported information 145 on time series 139. The prediction service 127 take these effects into account when generating the prediction requested by the user.

Figure 2:
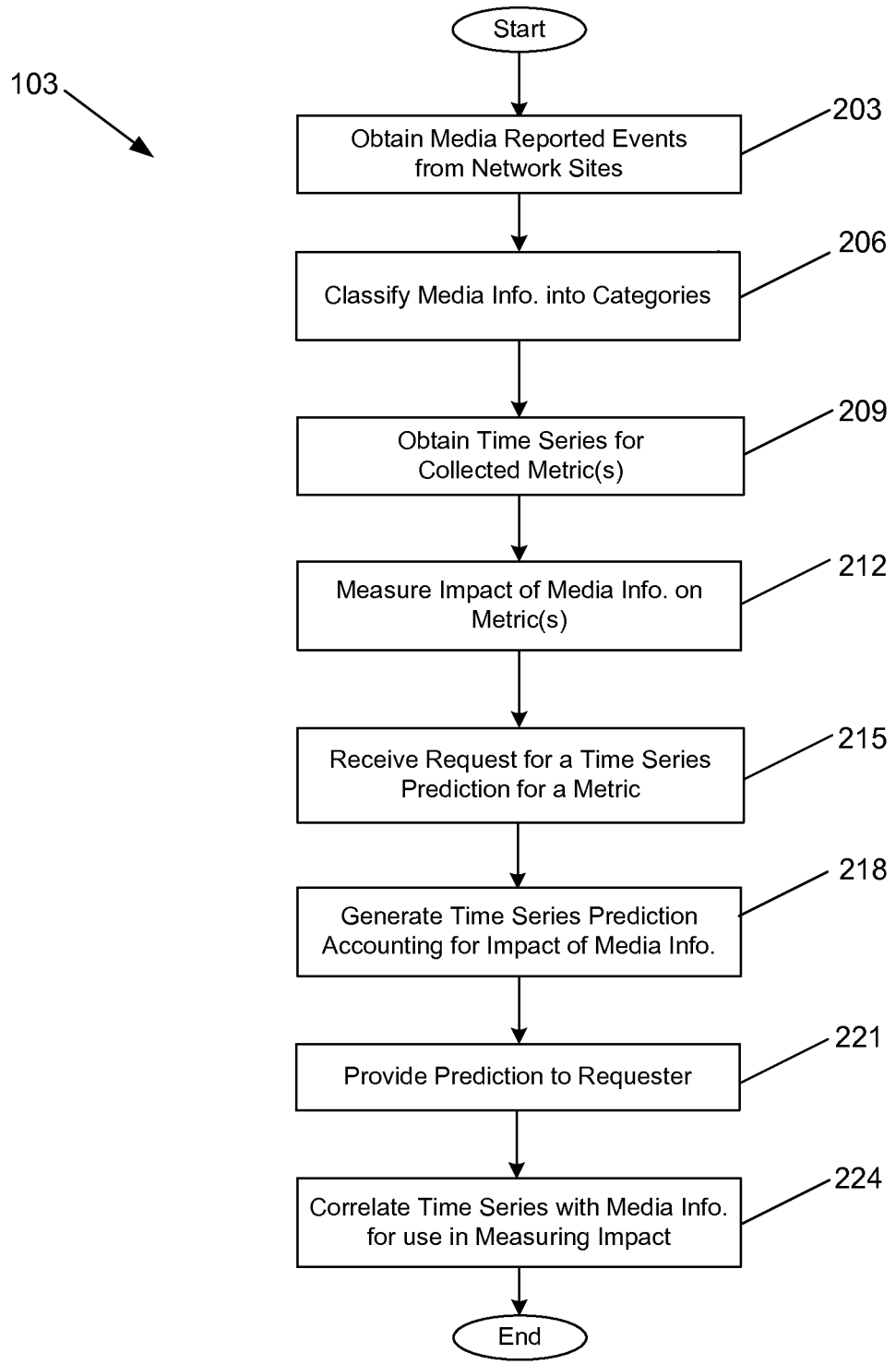
FIG. 2 is a flowchart illustrating an example of functionality implemented as portions of a components executed in a computing environment in the networked environment of FIG. 1 according to various embodiments of the present disclosure.

Moving on to FIG. 2, shown is a flowchart that provides one example of the operation of portion(s) of logic within the computing environment 103 according to various embodiments. It is understood that the flowchart of FIG. 2 provides merely an example of the many different types of functional arrangements that may be employed to implement the operation of portion(s) of the computing environment 103 as described herein. As an alternative, the flowchart of FIG. 2 may be viewed as depicting an example of steps of a method implemented in the computing environment 103 (FIG. 1) according to one or more embodiments.

Beginning at box 203, the network content crawler 118 obtains one or more instances of reported information 145 from one or more network content sites, for example, a social networking site, a news publisher site, or a news aggregator site. To this end, the network content crawler 118 retrieves content from these network sites, parses the content to identify keywords, indexes the content, and stores the content as reported information 145. The network content crawler 118 may use hyperlinks found on the network sites to "crawl" from one site to another.

Next, at box 206, the classification service 121 uses a machine learning technique to classify the reported information 145 into various information categories 148. Once an instance of reported information 145 is classified, the category 148 may be stored in association with the reported information 145. The classification service 121 may use keywords and contextual parsing to determine a category, or categories, for a particular instance of reported information 145. The categories may be organized as a hierarchy according to a taxonomy. In some embodiments, the information categories 148 are predefined. In other embodiments, the classification service 121 learns the categories as the media events are analyzed, for example, using a clustering algorithm.

The classification service 121 may be implemented using various machine learning techniques, as may be appreciated. A non-limiting list of example machine learning algorithms includes neural networks, classifiers, support vector machines, random forest classifiers, and flat forest classifiers, but others may be used as should be appreciated.

At box 209, the classification service 121 retrieves one or more time series 139 corresponding to metrics 136. Next, at box 212, the learning service 124 determines the effect or impact of one or more instances of reported information 145 on the metrics 136. To this end, the learning service 124 runs a mathematical regression model on the time series 139 for the metric 136 in order to find a correlation between a particular instance of reported information 145 and the metric 136. A correlation found by the regression model is then a measure of the impact or effect of the instance of reported information 145 on the metric 136, and this information is stored in the data store 133 as event impacts 151.

In some embodiments, the functionality at box 209 processes all reported information 145 and all metrics 136 to measure the impact of each instance of reported information 145 on each metric 136. This process may be done in the background, and the processing may be staggered to handle a relatively small number of metrics 136 and/or instances of reported information 145 during each pass. In other embodiments, the functionality at box 209 uses business rules to selectively determine which metrics 136 are likely to be affected by which reported information 145, and processes the smaller subset produced by application of these business rules. In still other embodiments, the functionality at box 209 does not measure the impact of an instance of reported information 145 on a particular metric 136 until a user requests a prediction for that metric 136.

At box 215, the prediction portal 130 receives a request from a user, via the client application 157, for a prediction on a particular metric 136. The request specifies the metric 136, a time period, and in some embodiments, a prediction model 142. The prediction portal 130 passes this information on to the prediction service 127, which retrieves the time series 139 corresponding to the requested metric 136 and time period. The prediction service 127 may use various techniques to generate a prediction for the time series 139, for example, statistical analysis, regression (including Gaussian processes), and machine learning.

Next, at box 218, prediction service 127 requests, from the learning service 124, a prediction that takes into account the impact of one or more instances of reported information 145 on the requested metric 136. As noted above, the learning service 124 may periodically determine such impacts and store the data as event impacts 151. In such embodiments, the learning service 124 responds to the prediction request by using a regression model and the event impacts 151 to generate the requested prediction according to the specified prediction model 142. In other embodiments, the learning service 124 determines the impacts 151 and generates the prediction on request.

Next, at box 224, the learning service 124 returns the prediction to the prediction service 127, which in turns returns the prediction to the prediction portal 130. The prediction portal 130 provides the prediction as a response to the requesting client application 157. The prediction portal 130 may encode the prediction for display at the client device 106, or may provide the information to the client application 157 for such encoding.

After the time period for the prediction has passed, at box 221, the correlation service 128 determines the accuracy of the prediction. To this end, the correlation service may examine the corresponding future values of the metric 136 and/or the corresponding future portions of the time series 139 for the metric 136 and identifying a correlation between the reported information 145 used in the prediction and the time series 139. The correlation service 128 may then annotate the information category 148 to indicate the accuracy of the forecast. For example, the correlation service 128 may determine that a hurricane event may provide 90% accuracy in forecasting a 60% increase in the metric 136, and annotate the hurricane event category with this accuracy measure.

In some embodiments, the items of reported information are ranked as to reliability of the prediction, and the rankings are used to derive a confidence level for the forecast. For example, some types of network content sources may be considered more reliable than others, or some particular instances of network content sources may be considered more reliable than others. As another example, the number of network content sources that report a particular item may be used to gauge the reliability, with the reliability increasing with the number of reporting sources.

The updated information may be provided as feedback to the learning service 124. The learning service 124 then uses the accuracy information when determining the impact of reported information 145 on metric 136. In this manner the learning service 124 uses information that is learned from one forecast to improve subsequent forecasts. The process of FIG. 2 is then complete.

In some embodiments, the prediction service 127 also generates an initial prediction that does not take into account the effect of reported information 145 on the requested metric 136 (i.e., is independent of the effect of the event 145). Providing this initial prediction, along with a revised prediction which does take into account the effect of reported information 145 on the requested metric 136, may be helpful to business consumers of the prediction service 127.

Figure 3:
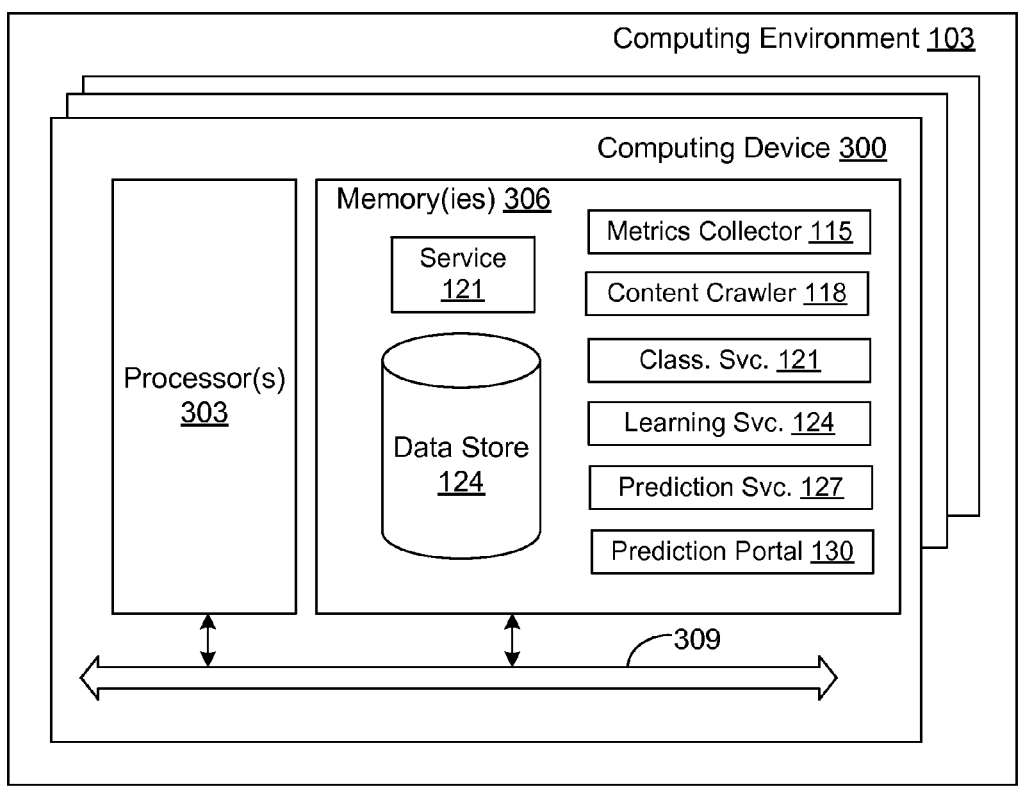
FIG. 3 is a schematic block diagram that provides one example illustration of a computing device employed in the computing environment of FIG. 1 according to various embodiments of the present disclosure.

Turning now to FIG. 3, shown is a schematic block diagram of a computing device 300 according to an embodiment of the present disclosure. The computing device 300 corresponds to a representative computing device which may be employed in the computing environment 103 (FIG. 1). The computing device 300 includes at least one processor circuit, for example, having a processor 303 and a memory 306, both of which are coupled to a local interface 309. To this end, the computing device 300 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the computing services 112, the metrics collector 115, the network content crawler 118, the prediction service 127, the learning service 124, the classification service 121, the prediction portal 130, and potentially other applications. In addition, an operating system may be stored in the memory 306 and executable by the processor 303. While not illustrated, the client device 106 (FIG. 1) also includes components like those shown in FIG. 3, whereby the client application 157 (FIG. 1) is stored in a memory and executable by a processor.

It is understood that there may be other applications that are stored in the memory 306 and are executable by the processor 303 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and executed by the processor 303, source code that may be expressed in proper format such as object code that is capable of being loaded into a random access portion of the memory 306 and executed by the processor 303, or source code that may be interpreted by another executable program to generate instructions in a random access portion of the memory 306 and executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network 109 (FIG. 1) that facilitates communication between any two of the multiple processors 303, between any of the processors 303 and any of the memories 306, or between any two of the memories 306, etc. The local interface 309 may comprise additional systems designed to coordinate this communication, including, for example, performing load balancing. The processor 303 may be of electrical or of some other available construction.

Although the computing services 112, the metrics collector 115, the network content crawler 118, the prediction service 127, the learning service 124, the classification service 121, the prediction portal 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in the flowchart of FIG. 2 may be executed concurrently or with partial concurrence. Further, in some embodiments, one or more of the blocks shown in the flowchart of FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the computing services 112, the metrics collector 115, the network content crawler 118, the prediction service 127, the learning service 124, the classification service 121, and the prediction portal 130) that comprises software or code can be embodied in any non-transitory computer-readable medium for use by or in connection with an instruction execution system such as, for example, the processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed, the program causes the computing device to at least:

crawl a plurality of network sites to retrieve a plurality of network pages;
parse the plurality of network pages to discover a plurality of media reported events;
index the plurality of media reported events;
classify the indexed media reported events into a plurality of categories;
receive a request for a prediction for a time series;
generate, in response to the request, an initial prediction for the time series, the initial prediction being independent of the plurality of media reported events, the time series associated with a metric observed in a computing system;
measure an effect of at least one of the plurality of media reported events on the time series;

revise the initial prediction to take into account the effect of the at least one of the plurality of media reported events; and respond to the request by providing the revised prediction.

2. The non-transitory computer readable medium of claim 1, wherein the plurality of network pages comprise at least one of a social networking site, a news publisher site, or a news aggregator site.

3. A method, comprising:

classifying, by a computing device, information retrieved from a plurality of network content sources into a plurality of categories;

determining, by the computing device, an impact of at least one instance of the classified information on a metric associated with a time series by determining a correlation between the at least one instance of the classified information and the metric; and generating, by the computing device, a prediction for the time series taking into account the impact of the at least one instance of the classified information.

4. The method of claim 3, wherein the prediction is generated by at least one of statistical analysis, regression, Gaussian process regression, or machine learning.

5. The method of claim 3, further comprising:

determining, by the computing device, an accuracy of the prediction associated with the metric; and improving, by the computing device, the accuracy of a subsequent prediction associated with the metric.

6. The method of claim 3, further comprising:

wherein the prediction is generated in response to receiving a request for the prediction.

7. The method of claim 3, wherein the correlation is determined using a machine learning technique.

8. The method of claim 3, wherein the generating further comprises:

generating, by the computing device, a first prediction for the time series that is independent of the determined impact; and generating, by the computing device, as the prediction, a revised prediction for the time series that takes into account the impact of the at least one instance of the classified information on the metric.

9. The method of claim 3, wherein the categories are hierarchical.

10. The method of claim 3, wherein the at least one instance of the classified information is discovered through at least one of a social networking network site, a news publication network site, or an electronic commerce network site.

11. The method of claim 3, further comprising:

crawling, by the computing device, a plurality of network sites to discover the information; and indexing, by the computing device, the information.

12. The method of claim 3, further comprising:

receiving, by the computing device, a feed from at least one network site, the feed describing the information; and indexing, by the computing device, the information.

13. The method of claim 3, further comprising generating, by the computing device, at least one of the categories based at least in part on the information.

14. A system, comprising:

at least one computing device; and at least one application implemented in the at least one computing device, wherein when executed, the at least one application causes the at least one computing device to at least:

classify a plurality of items of information reported from at least one network content source into a plurality of categories;

measure an effect of at least one of the reported items of information on at least one metric observed in a computing system by determining a correlation between the at least one of the reported items of information and the at least one metric;

generate an initial prediction for a time series that is associated with the at least one metric, the initial prediction being independent of the effect of the at least one of the reported items of information on the at least one metric; and revise the initial prediction to take into account the effect of the at least one of the reported items of information on the at least one metric.

15. The system of claim 14, wherein when executed, the at least one application further causes the at least one computing device to at least apply a plurality of business rules to select a portion of the reported items of information.

16. The system of claim 14, wherein the correlation is determined using a machine learning technique.

17. The system of claim 14, wherein when executed, the at least one applicaton further causes the at least one computing device to at least assign an importance to each category.

18. The system of claim 14, wherein when executed, the at least one application further causes the at least one computing device to at least learn the categories by analyzing the reported items of information.

19. The system of claim 18, wherein learning the categories further comprises using a clustering algorithm.

20. The system of claim 14, wherein classifying a plurality of items further comprises using a machine learning technique.

21. The system of claim 20, wherein the machine learning technique is at least one of a classifier, a forest classifier, a support vector machine, a clustering analyzer, or a neural network.

22. The system of claim 14, wherein the at least one of the reported items of information is indicated in a prediction request.

23. The system of claim 14, wherein the initial prediction for the time series is generated according to a prediction model indicated in a prediction request.

* * * * *